Mar. 27, 1923.
H. W. HILL
LENS
Filed Oct. 25, 1920
1,449,941
3 sheets-sheet 1
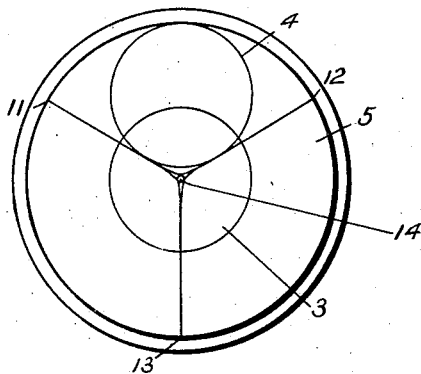
Fig. I
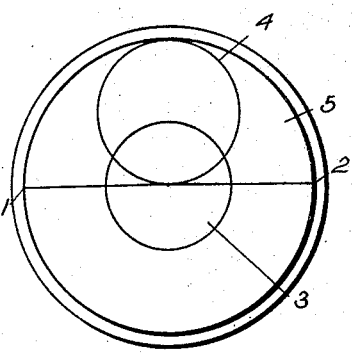
Fig. II
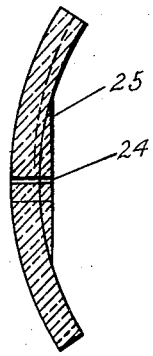
Fig. III
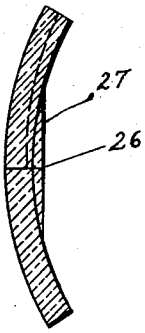
Fig. IV
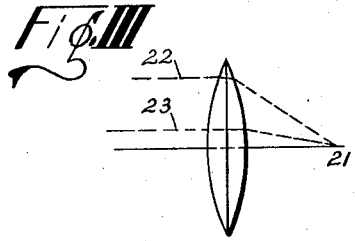
Fig. V
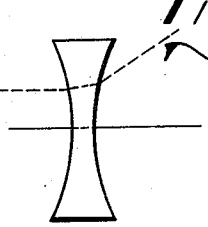
Fig. VI
INVENTOR
HARRY W. HILL
BY
H. H. Styll  A. H. Parsons
ATTORNEYS

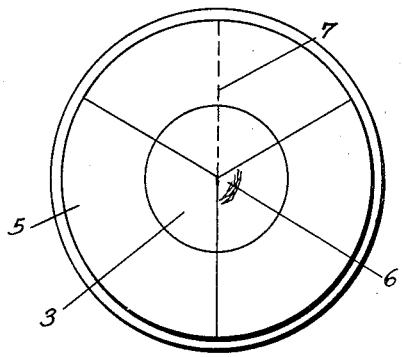
Fig. VII
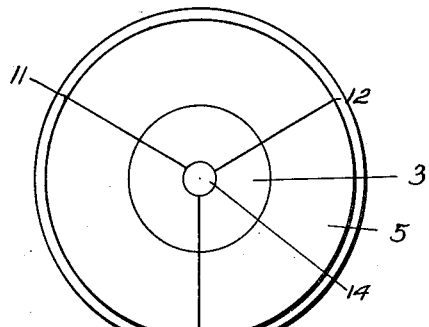
Fig. VIII
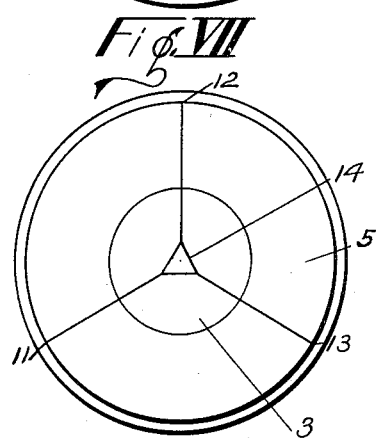
Fig. IX
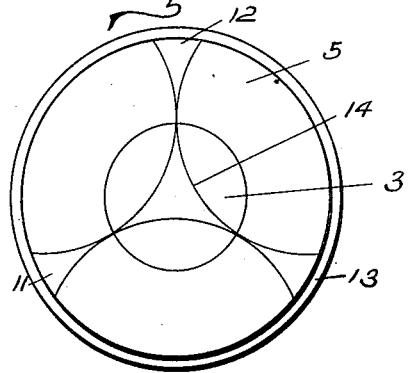
Fig. X
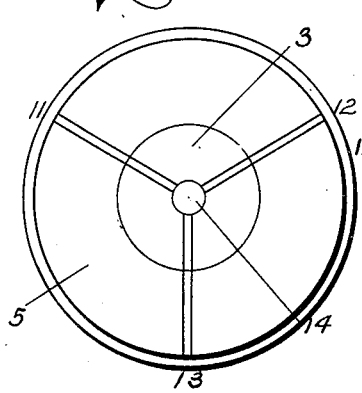
Fig. XI
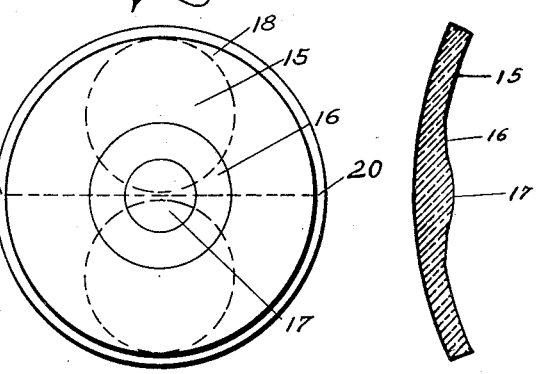
Fig. XII  Fig. XIII
INVENTOR
HARRY W. HILL
BY
ATTORNEYS Mar. 27, 1923.
H. W. HILL
LENS
Filed Oct. 25, 1920
1,449,941
3 sheets-sheet 3
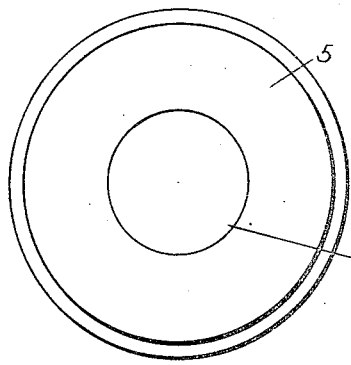
Fig. XIV
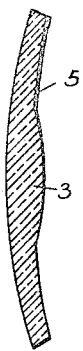
Fig. XV
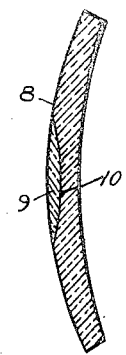
Fig. XVI
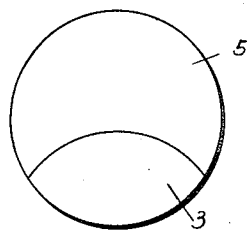
Fig. XVII
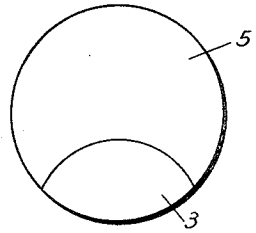
Fig. XVIII
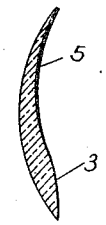
Fig. XIX
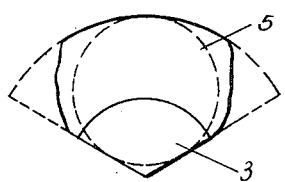
Fig. XX
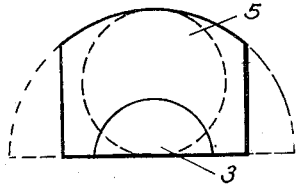
Fig. XXI
INVENTOR
HARRY W. HILL
BY
H. H. Styll & H. K. Parsons
ATTORNEYS Patented Mar. 27, 1923.

1,449,941

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

Application filed October 25, 1920. Serial No. 419,376.

*To all whom it may concern:*

Be it known that I, HARRY W. HILL, a citizen of the United States, residing at Southbridge, in the county of Worcester and State of Massachusetts, have invented certain new and useful Improvements in Lenses, of which the following is a specification.

This invention relates to the manufacture of opththalmic lenses and has particular reference to an improved process of manufacturing multifocal lenses, and to an improved series of commercial multifocal lenses and lens blanks.

The principal object of the invention is to increase the output or production of multifocal lenses without materially increasing the amount of labor or equipment required to produce them.

Another object is to provide an improved process for producing multifocal lenses such as are initially manufactured in a major blank of target formation having the reading portion in the center of the blank and surrounded by the distance portion, whereby the largest possible number of minor blanks or lenses may be obtained from the major blank or target within permissible limits of prism displacement.

Another object is the provision of an improved process for separating the major blank into its minor blanks in such a way that none of the minor blanks are injured or destroyed when the major blank is separated.

Another object is the provision of an improved commercial series of multifocal lenses or lens blanks whereby the difference in prism displacement in the two eyes of the patient may be practically equalized from stock lenses or blanks.

Another object is the provision of an improved commercial series of multifocal lenses and lens blanks wherein the several lenses or blanks of the series will be so related as to maintain the prism displacement in the reading portion within permissible limits.

Another object is the provision of an improved commercial series of multifocal lenses and lens blanks wherein the sizes of the reading portion are regulated to maintain the prism displacement within permissible limits and at the same time to allow of the largest possible number of lenses being obtained from the major blank.

Other objects and advantages of the invention should be readily apparent by reference to the following specification taken in connection with the accompanying drawings, and it will be understood that I may make any modifications or departures from the specific features disclosed, or in the manner or order of carrying out the several steps of the process within the scope of the appended claims without departing from or exceeding the spirit of the invention, the preferred from of the invention and the steps of the process being described by way of illustration and example.

Figure I represents a diagrammatic plan view of one of my improved forms of major blank.

Figure II represents a plan view of a different major blank as employed in my process.

Figure III represents a diagrammatic sectional view of the blank shown in Figure I.

Figure IV represents a similar view of the blank shown in Figure II.

Figures V and VI are illustrative views comparing prismatic action of different lenses.

Figures VII, VIII, IX, X and XI represent diagrammatic plan views of major blanks showing the division lines of the minor blanks.

Figures XII and XIII represent plan and central cross sectional views of a trifocal major blank.

Figures XIV, XV and XVI represent plan and central cross sectional views of a bifocal major blank, XV being a one-piece blank, and XVI a fused blank.

Figure XVII shows a plan view of a finished lens cut from a three part blank.

Figure XVIII shows a plan view of a finished lens cut from a two part blank.

Figure XIX shows a diagrammatic central cross sectional view of Figures XVII and XVIII.

Figure XX shows a plan view of a three part lens blank as cut from the minor section of the major blank.

Figure XXI shows a plan view of a two part lens blank as cut from the minor section of the major blank.

Prior to this invention it has been customary to form bifocal lenses of the higher grades of one-piece and fused bifocals from a major blank of target shape, as shown in Figure II. The reading portion forms the center or bull's eye of the target, and the distance portion surrounds it. These two focal portions have been either formed on one piece of glass, as shown in Figure XV, or of two pieces of glass fused together, as shown in Figure XVI. These major blanks have been made in series wherein the distance curve has been ground to different powers, as for instance 4 diopter, 6 diopter, 8 diopter and 9 diopter; that is to say, one series will be ground to 4 diopters, another 6 diopters, and so on. The reading powers or additions, as they are termed, range in each series from the lowest to the highest powers, say from .50 diopters to 4.50 diopters, with a variation of say one-quarter of a diopter in some portions of the range, and of one-eighth diopter in other portions of the range, etc.

After the major blank has been formed as described it was cut into minor blanks, each of which was capable of forming a single bifocal lens. In Figure II the major blank is cut into two minor blanks, being separated on the line 1—2; each minor blank here is a semi-circle. From the minor blank the single lens, as 4 in Figure II, is cut, including a portion of the reading power, as indicated by the circle 3, Figure II, and a portion of the distance power indicated by 5 in the same figure.

It has been customary in the commercial lenses and blanks made in this way to make the reading sections of a standard size for the whole range of the series. In practice there have been some three or four different size reading segments in general use. With most of these sizes it has been possible to cut only one minor blank from the major blank; the most that have been cut has been two, as shown in Figure II.

It will, therefore, be seen that any process that will increase the number of minor blanks that can be cut from the major blanks materially increases the production without increase in labor or equipment, as for instance if three can be cut instead of two, the production is increased fifty per cent, if four, the production would be doubled, etc. There are reasons, however, which have hitherto prevented this increase. They are:

First—To increase the number of minor blanks it is necessary to increase the diameter of the reading portion in order to get a reading section of proper size, but immediately you increase the diameter of the reading portion you increase the optical error known as prism displacement. With large reading segments it was impossible to make the range of powers in the series without excessive prism displacement in the higher numbers or additions as they are termed. This prism displacement referred to is that in the reading portion, and it also increases with the power of the reading portion. The effect of prism displacement will be explained hereafter. I conceived, however, that if I regulated the diameter of the reading portion I could for a greater portion of the range of powers, get more than two minor blanks from a major blank, and still not exceed the permissible amount of prism displacement, and by changing the diameter of the reading segment I could get in the remainder of the range two minor blanks from each major blank, thus very materially increasing the production of these lenses without increase of labor or equipment. This type of lens is produced piece by piece, one major blank at a time, practically all labor, and is the most expensive of all opthalmic lenses to produce; hence a material saving of 30 per cent or better was a consideration of the first moment and had long been widely sought for by manufacturers and inventors.

As stated, the size of the reading portion was maintained for every number of the series to make it standard. The popular preference has been for the larger sizes, and this preference is increasing not only for larger size reading portions but for larger size lenses themselves, hence a large proportion of the demand has been for sizes allowing only one lens to be cut from a major blank. It will be clear, therefore, that with a standard size of reading segment for the whole range, the diameter of the reading portion will have to be small or else the prism displacement will be excessive in the higher power sections of the range. Where larger size reading segments are required only one lens can be cut from the major blank, an expensive and wasteful procedure. In my improved process I regulate the size of segment by the amount of prism displacement therein keeping in mind the demand for large segments. When the prism allowance is exceeded I decrease the diameter of the segment and run on until the prism allowance is again exceeded, when I decrease again, etc. I also make the diameter of the segment such as to get the greatest number of lenses from each major blank. Many variations thus may be made in the series, both in size of segments and the number of lenses that may be cut from the major blank, all within permissible prism limits. I have, however, found that if I arrange the diameter to cut three lenses from a major blank for a range of from .50 to 2.50 diopters, and two above that highly satisfactory lenses can be made both as to size of reading segment and prism displacement, with a very small difference in the size of the two segments from each other.

Another advantage I obtain from my process is the providing of stock lenses for patients having a difference of reading power in the two eyes. By fitting the high power eye with one size and the low power eye with the other size, prismatic balance may be maintained. It is to be noted that within limits there is little distress from prism before the two eyes if the prism is balanced or practically the same for both eyes, but if the prism is different for the two eyes great distress is experienced. Hitherto bifocals have had to be made specially where there was a difference in power between the eyes, making the lenses exceedingly expensive and causing long delay to the patient, as the lenses had to be specially prepared by the factory to fit the individual prescription and could not be supplied by the dispensing optician from stock blanks.

In order that prescriptions could be filled by the dispensing optician, the business procedure has been for the manufacturer to provide the dispensing optician with a series of stock blanks. These stock blanks are the minor blanks cut from the major blanks. They are finished on the bifocal side only, the other side is left unfinished and on this side the dispensing optician puts the prescription curve, adapting the blank to the patient's prescription. As stated, these stock blanks are ground in series, the distance portion being usually 4, 6, 8 and 9 diopters, and the reading portion varying from .50 to 4.50 diopters; that is to say, there will be a series having a distance portion of 4 diopters and reading portions varying from .50 to 4.50 diopters, a series having a distance portion of 6 diopters and reading portions varying from .50 to 4.50 diopters, and so on. The distance curve is called the base curve; hence there will be a series of 4 base having all the reading additions, one of 6, one of 8, and one of 9, etc. The optician may purchase one series, two, three, or all four, as he desires. The fewer the number of base curves used, the larger the stock of lenses the optician will have to carry. In some instances business has been done by carrying in stock only one base curve, as the 6 for example. If the blanks were not carried in stock the optician could not fill the patient's prescription and the factory would have to make each prescription separately, a slow and expensive operation and not commercially practicable; hence the consideration of my invention is to provide means for producing as many as possible stock blanks from each major blank within optical limitations.

Of course, it will be understood that the manufacturer can and often does finish both sides of the blank, and can do so either before or after he separates the major blank into the minor blanks.

In experimenting with the separation of the major into the minor blanks I have discovered that where I attempted to cut three or an odd number of minor blanks from the major blank the cleavage lines would terminate in a point at the center of the blank, as shown in Figure VII, and when I attempted to separate the parts on the cleavage lines the minor blanks instead of following the cleavage lines would either crumble at the angular central peak, as indicated in dotted lines 6, or would break out across the field of a minor blank, as indicated by dotted line 7 in Figure VII. I, however, found that by placing a central switch or gate-way for the central portion of the minor blanks to follow, this breakage and waste was avoided, so that an important part of my process is the provision of means to allow the minor blank to separate clean from the major blank, avoiding crumbling or breaking of the minor blanks. One form of doing this I have described in my Patent No. 1,340,715 of May 18, 1920, in which first disclosure of my process in part is made; that is to say, in so far as the present process contemplates the formation of a major blank to be separated into a plurality of parts without the breakage or spoiling of said parts, although as stated this process contemplates several further improvements.

Prism displacement is the optical effect of light passing through a transparent medium, such as glass shaped in the form of a prism; that is where the faces of the medium are so shaped as not to be parallel, forming a wedge shaped body, the light is refracted or bent towards the base or thickest portion of the wedge or prism. This effect is present in all lenses having optical power, as the surfaces of such lenses are not parallel but either converge or diverge from the optical center of the lens, depending on its character. A double convex lens is thickest at its center; the light hence is bent towards the center, as shown in Figure V. A double concave lens is thickest at its edges; the light hence is bent towards the edges, as shown in Figure VI. The amount of prismatic displacement increases as the two surfaces depart from parallel relationship with each other, the stronger the power of the lenses the greater the prism displacement, hence in the stronger power reading portions the prism is larger than in the weak ones. This prism displacement is well understood by those versed in the optical properties of lenses.

Permissible prism displacement in bifocals has been considered by the authorities to be about 3½ prism diopters at a point about 5 millimeters below the line of joinder of the distance and reading portions. A spherical lens when viewed through the exact optical center has no prismatic displacement, but in one diopter power has a displacement of one prism diopter for every centimeter out from the optical center, so at 1 centimeter out there is a relatively small displacement, and at 5 centimeters out a much greater one; and a proportional increase in prism for every increase in dioptric power; hence as the diameter of the reading portion is increased the 5 milli-meters from the outer edge of the reading portion is brought farther away from the optical center of the lens and the prismatic displacement increased, except of course, in so far as it is counteracted by the curve placed on the other side of the blank. Prism has two pronounced disadvantages in multifocals, i. e., displacement of the image from its normal position, and muscular imbalance in eyes of unequal power. Prism varies in accordance with two factors; either displacement of the point being viewed through, or the power of the lens. The amount of prism present at the same point in a 3 diopter lens is three times as great as that of a 1 diopter lens.

My improved process and series of multifocal lenses is designed to provide commercial stock lens of this stype in such a way as to obtain the greatest number from a major blank having no excess of prism and also to provide stock lenses that will balance the prism in eyes of unequaled power. It is clear, therefore, that to increase the number of minor blanks obtainable from a major blank, it is necessary to increase the diameter of the reading portion. It is also clear that if the diameter of the reading portion is increased the prism displacement is increased. In my invention I have taken cognizance of these factors and have produced a process and a resulting series of commercial stock lenses that produces the greatest output from labor and equipment, yet maintains the optical properties of the lenses and provides means for fitting unusual prescriptions from stock, all considerations which have been long sought in the art.

Having described the principles and considerations underlying my invention, I will now describe one of the preferred modes of carrying out my process and the products resulting therefrom.

I first prepare the target major blank of requisite size and thickness; this may be of one piece of glass, as shown in Figure XV, or of two pieces fused together, as shown in Figure XVI. If of one piece of glass I may either grind and polish the two curves proceeding directly, or if preferred I may first mold the glass to approximate curves, size and shape, then grind and polish the two curves, i. e., the distance curve 5 and the reading curve 3, to desired powers. The apparatus for grinding and polishing these curves is well known and is described in Patent No. 836,486 to Conner and Patent No. 1,084,529 to Bentzon and Emerson. If the glass is of two pieces fused together I grind the whole bifocal face to one curve 8 in Figure XVI, using regular grinding and polishing tools long standard in the art, the reading segment 9 having been previously fused in the distance portion, the parts having been ground to a common countersink curve 10, and being of such relative refractive index as to give the requisite addition or reading power as has been long practiced in the art and described in Patent No. 876,933 to Borsch.

I regulate the diameter of the reading portion 3 to a size determined by its prism displacement, its size, and the number of minor blanks of requisite size of reading portion that may be cut from the major blank without unduly increasing the number of different size segments in the bifocal range, it being clear that for commercial purposes there must be very little difference in size of reading portions, they must be as near a standard size as possible. I have found that by using two sizes of reading portions I can get three minor blanks up to additions of 2.50 diopters and above and two minor blanks for the rest of the range from a major blank, which sizes closely approximate each other and give more than ample size of segment as compared with present day standards. Of course, if desired I could increase the number of minor blanks obtainable from the major blank, in the low additions, but my preference is to keep down the number of sizes in the range of additions, the distance portion of the major blanks may be finished to one base curve such as 6 diopters, or several different base curves, such as 4, 8 and 9, or others may be used as desired. The reading curves or additions will range on each base series from about .50 to 4.50 diopters or above with differences of power of from one-eighth to one-quarter diopter in different portions of the range, as usual.

Having formed the bifocal side of the major blanks, I next proceed to separate the major blanks into the minor or lens blanks. On the major blanks having a diameter of reading segment 3 sufficient to cut three minor blanks, I prepare the cleavage lines 11—14, 12—14 and 13—14, Figure I, and at the center put in the switch or fillet cleavage section 14 in order that the minor sections will not crumble at the central point or break out across the center into the field of one of the minor sections. The cleavage lines may be cut in as with a diamond or other hard substance, as shown in Figure I, or may be molded as shown in Figure XI.

The switch portion 14 may be a fillet curve as shown in Figures I and X, a circle, triangle, other shape, or hole, as shown in Figures VIII, IX and XI, or any convenient form of gate-way to shunt the line of breakage from across the center. It is clear that this can be accomplished by making the cleavage lines continuous past the center, as shown in Figure X, or in any manner which prevents the formation of a sharp central point shown in Figure VII. If the lines are molded as shown in Figure XI they should be sharp and deep enough to insure breakage along the lines and not across the field of any of the minor segments. The whole point is to switch or shunt the breakage away from adjoining or opposite minor segments, but along the lines of separation of each minor segment from the others. In Figure VII the dotted lines 6 and 7 show breakage effects if the cleavage lines meet in a point at the center.

The major blanks having a reading segment of diameter sufficient for only two minor blanks are next separated into minor blanks by placing the cleavage line 1—2 on the major blank in similar way to that for the three part major blanks and separating into two halves. Of course, it makes no difference in which order the major blanks are separated. They may all be done at the same time or at different times and in any order desired.

Having separated the minor blanks we now have two sets of minor blanks, those up to about 2.50 addition having one size reading portion, and those above another size reading portion, but both sizes will have a prism displacement within the permissible amount.

These minor blanks are next trimmed if desired to approximate lens blank form, as shown in Figures XX and XXI, and placed in cartons marked to indicate the reading and distance curves of the blank.

These minor blanks provide a series of lens blank of reading addition from the lowest to the highest on the distance base curves desired, and from them any desired prescription within ordinary demand may be filled by the dispensing optician who places the curve on the unfinished side.

All of the resulting lenses will have a prism displacement within permissible limits, and eyes of unequal power may be fitted by the dispensing optician using one size of reading segment where the powers will permit, and the two sizes of reading segments where the powers are widely separated, the difference in size being such as not to be very noticeable unless attention is directed to it.

While bifocal lenses have been referred to herein more specifically it will be understood my invention also applies to trifocals and other multifocals as well. In Figures XII and XIII, I have shown a trifocal major blank in which 15 is the distance portion 16 an intermediate power, and 17 the strongest power; the dotted lines 18 show the lines on which the lenses are to be cut, and the line 19—20 the line on which the major blank is to be separated.

While I have described a two size range of bifocals as the preferred arrangement, it will be understood that I can use three or more sizes of reading segment, the process being to change the size of the reading portion when the prism limits are exceeded in the range and to drop back to a diameter that will again insure the proper prism power, and so on.

Figure XVII shows a finished lens cut from a three part major blank, and Figure XVIII one cut from a two part major blank. Figure XIX is a diagrammatic central cross section of Figures XVII and XVIII.

The dotted lines in Figure XX indicate the original minor segment from which the lens blank was cut.

From Figure V it will be seen that the prism displacement is greatest as you approach the edge of the lens. The ray 23 will be bent to the point 21, and the ray 22 will also be bent to same point, hence its displacement is much greater. Referring to Figures III and IV, it will be seen that the point 25, indicating a position five millimeters below the line of joinder of the two curves Figure III, is farther from the center than the corresponding point 27, Figure IV; hence the prism displacement will be greater in Figure III than in Figure IV; Figure III shows the diameter of reading curve used in Figure I, and Figure IV that used in Figure II. The inherent prism of the bifocal side, of course, is modified or affected by the curve placed on the non-bifocal side, increasing or decreasing the inherent prism, as the case may be. To provide stock lenses to meet cases where the curve of the second side will reduce the prism within permissible limits, I find I can make a series of blanks covering the range of additions with one diameter, other series, one or more, of another diameter, each covering the range of additions; hence by selecting the proper diameter of reading portion for each eye I can get the best results as to the resultant prisms, or combination of lenses introducing the smallest vertical imbalance.

The prismatic effect about which we are talking in connection with bifocal lenses, it is to be understood, is the vertical prism or imbalance, since this is the feature affected by the bifocal portion. This is the one deserving more attention, at any rate, since the eye muscles are so constituted as to be able to care for a much greater imbalance laterally than they are vertically.

My improved series has, therefore, been so constructed that lenses may be selectively adopted from it with the consent of the patient to give the best theoretical correction and most nearly take care of tendency to introduction of vertical imbalance due to prism when different powers of lenses are employed.

The lines 4 in Figures I and II indicate a finished round lens cut from a minor segment of the major blank.

Figure XXI indicates a lens blank cut from a two part major blank, the dotted lines indicating the original minor segment.

Having described my invention and the method of carrying same into operation showing how the lens blanks are made and prepared for use, it will be seen that I have provided a series of commercial multifocal lenses and means for making the same which will greatly enhance the production and fitting of such lenses within the present limits of labor, equipment and facility, and at the same time maintain the optical properties of the lens and provide new facilities and economy in the fitting of multifocal lenses to eyes of unequal power in the same individual, considerations of great importance to the art and long sought for.

I claim:

1. A series of unitary bifocal lens blanks finished on the bifocal side to the distance and reading curves, covering the usual range of bifocal additions each unit having the same distance curve as all the other units and a different reading curve from all the other units, the diameter of all the reading curves being the same up to the point in the series where the prism displacement is within three and one-half prism diopters, and the units beyond that point having another diameter common to them but different from the first group, and a prism displacement of less than three and one-half diopters.

2. A series of unitary bifocal lens blanks finished on the bifocal side to the distance and reading curves covering the range of bifocal additions, each unit having a common distance curve and a different reading curve from the other units, the diameter of all of the reading curves being the same up to the point in the series where the prism displacement is within permissible limits, and the units beyond that point having another diameter common to them but different from the first group and a prism displacement within permissible limits.

3. A series of blanks for bifocal lenses made in target form having the reading portion in the center and the distance portion surrounding it, covering a large range of bifocal additions, having the distance curve the same for all of the blanks, the reading curve different for each blank of the series, the diameter of the reading portion the same for each blank of the series, the prism displacement for the reading portion of each blank within permissible limits, and the diameter of the reading portion of size to get three single lenses of commercial size from the target.

4. The process of manufacturing a series of one-piece bifocal lenses for the usual run of prescriptions, comprising grinding a plurality of blank discs with the diameter of reading portion large enough to cut three lens blanks, each of which will have a standard size of segment, grinding a plurality of target discs with the diameter of reading portion in size sufficient to be cut into two lens blanks each of which will have a standard size of segment, separating the first set into three blanks for those powers of lenses having a prism of less than a predetermined allowable amount, and separating the others into two lens blanks for powers that would exceed this amount for blanks cut three from a disc.

5. A bifocal lens series having a range of several powers in which each of the lenses of the series has the same distance portion curve but a different reading portion curve, and in which the diameter of the reading portion curve is a variable for different groups in the series, substantially as and for the purpose described.

6. A bifocal lens series having a range of several powers, in which each of the lenses of the series has the same distance portion curve but a different reading portion curve, and in which the diameter of the reading portion curve is a variable for different groups in the series determined to maintain the prism limit below a predetermined amount in each unit of the group.

In testimony whereof I have affixed my signature, in presence of two witnesses.

HARRY W. HILL.

Witnesses:
HARRY H. STYLL,
H. K. PARSONS.